United States Patent

Shimura

[11] Patent Number: 5,277,279
[45] Date of Patent: Jan. 11, 1994

[54] DISK BRAKE

[75] Inventor: Yukitoshi Shimura, Yamanashi, Japan

[73] Assignee: Tokico Ltd., Kanagawa, Japan

[21] Appl. No.: 953,882

[22] Filed: Sep. 30, 1992

[30] Foreign Application Priority Data

Oct. 2, 1991 [JP] Japan .................. 3-255596

[51] Int. Cl.$^5$ ............................................ F16D 55/00
[52] U.S. Cl. ............................... 188/72.5; 188/71.1
[58] Field of Search ............... 188/72.4, 72.5, 369, 188/370, 71.1; 92/146, 163

[56] References Cited

U.S. PATENT DOCUMENTS

| | | | |
|---|---|---|---|
| 2,799,367 | 7/1957 | Dotto | 188/72.5 |
| 2,926,757 | 3/1960 | Armstrong | 188/72.5 X |
| 3,331,473 | 7/1967 | Hayes | 188/72.5 X |
| 4,090,590 | 5/1978 | Karasudani et al. | 188/72.5 |

FOREIGN PATENT DOCUMENTS 61-37873 1/1986 Japan .

Primary Examiner—Matthew C. Graham
Attorney, Agent, or Firm—Wenderoth, Lind & Ponack

[57] ABSTRACT

A disk brake includes a plurality of cylinders for slidably receiving pistons for pressing a pad. Each of the cylinders has a main portion for supporting the piston, and an annular groove provided at the bottom of the main portion with a diameter larger than that of the inner cylindrical surface of the main portion. Each pair of adjacent cylinders communicate with each other through a communicating hole that extends from the inner wall of the main cylindrical portion of one cylinder to the annular groove of the other cylinder through the annular groove of the one cylinder. A drill for making such a hole thus need not interfere with the inner wall of the one cylinder at the open-end portion thereof.

7 Claims, 5 Drawing Sheets

DISK BRAKE

BACKGROUND OF THE INVENTION

1. Field of the Invention

The present invention relates to a disk brake having a plurality of pistons disposed side-by-side for pressing a pad.

2. Description of the Prior Art

A disk brake having a plurality of pistons has advantages in that the diameter of each piston can be made smaller than in a case where a single piston is used, and it is therefore possible to apply a braking force to the disk at a position as remote from the axle as possible, and that such a braking force can be distributed by a plurality of pistons, and further that it is advantageous in achieving a reduction in size. Accordingly, this type of disk brake is widely applied to two-wheeled vehicles.

A plurality of cylinders for receiving these pistons need to communicate with each other in order that the same fluid pressure can be applied to the plurality of pistons simultaneously. Hitherto, communication between the cylinders has been provided by a hole that that extends obliquely from the bottom of one of each pair of adjacent cylinders toward the other cylinder, and another hole extends obliquely from the bottom of the second cylinder toward the first cylinder so that these two holes intersect each other, as will be described later in detail with reference to the drawing. Accordingly, two holes need to be machined to obtain one communicating portion. Thus, the prior art requires a large number of steps for machining process and hence, costs a great deal.

When the number of cylinders is three or more, some of the axes of the holes intersect each other at the cylinder opening side. Accordingly, drill driving units for machining such holes interfere with each other, so that it is impossible to make a boring device that machines a plurality of holes in one stroke. This is another factor that necessitates a large number of machining steps.

SUMMARY OF THE INVENTION

It is an object of the present invention to provide a disk brake which is designed so that adjacent cylinders can communicate with each other through a single hole and thus the machining cost can be reduced.

To this end, the present invention provides a disk brake including a rotating disk, a caliper having portions respectively provided at both sides of the disk so as to face side surfaces of the disk, and a pad disposed between each of the portions of the caliper and the disk, at least one of the portions of the caliper being provided with a plurality of cylinders having the same depth for slidably receiving pistons for pressing the pad. Each of the cylinders has a main portion for supporting a piston, and an annular groove provided at the bottom of the main portion with a diameter larger than that of the inner main cylindrical wall of the main portion. Adjacent cylinders communicate with each other through a communicating hole that extends from an inner main cylindrical surface of one cylinder to the annular groove of the other cylinder through the annular groove of the one cylinder. A drill for making the hole does not interfere with the inner wall of the one cylinder at the open-end portion. The communicating hole is disposed so that an edge between it and the annular groove of the one cylinder is offset from the bottom of one cylinder toward the open-end portion of the same cylinder, and the edge between it and the annular groove of the other cylinder is offset from the margin of the groove, closest to the open-end portion of the other cylinder, toward the bottom of the same cylinder.

In addition, the present invention provides a disk brake including a rotating disk, a caliper having portions respectively provided at both sides of the disk so as to face side surfaces of the disk, and a pad disposed between each of the portions of the caliper and the disk, at least one of the portions of the caliper having three cylinders provided side-by-side with the same depth for slidably receiving pistons for pressing the pad. Each of the cylinders has a main portion for supporting the piston, and an annular groove provided at the bottom of the main portion with a diameter larger than that of the inner cylindrical wall of the main portion. The disk brake further includes communicating holes which respectively extend from the inner walls of the main portions of the cylinders at both ends of the row of the cylinders to the annular groove of the central cylinder through the annular grooves of the end cylinders. The communicating holes are provided so that the axes extend toward each other at the cylinder bottom side and the drills for making the holes do not interfere with the respective inner walls of the end cylinders at the open-end portions.

BRIEF DESCRIPTION OF THE DRAWINGS

The above and other objects, features and advantages of the present invention will become more apparent from the following description of preferred embodiments thereof, taken in conjunction with the accompanying drawings, in which like reference numerals denote like elements, and of which.

DETAILED DESCRIPTION OF THE PREFERRED EMBODIMENTS

Figure 5:
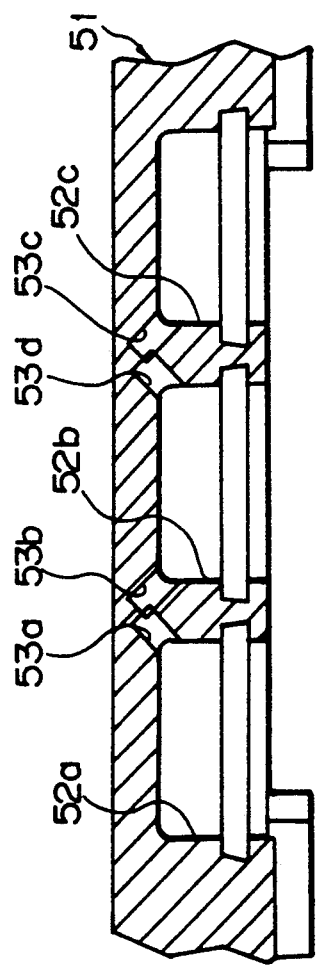
FIG. 5 is a sectional view of one half of a caliper of a conventional disk brake.

FIG. 5 shows a conventional disk brake, in which a caliper 51 has cylinders 52a to 52c of the same depth and which are arranged side-by-side. The adjacent cylinders 52a and 52b (53c and 52b) communicate with each other through respective blind holes, that is, communicating holes 53a and 53b (53c and 53d). More specifically, the communicating holes 53a and 53c are bored in the respective bottoms of the cylinders 52a and 52c disposed at opposite ends of the row of cylinders so as to extend obliquely toward the central cylinder 52b, whereas the communicating holes 53b and 53d are bored in the bottom of the central cylinder 52b at respective positions so as to extend obliquely toward the end cylinders 52a and 52c, respectively, in symmetrical relation to the communicating holes 53a and 53c so that neighboring holes 53a and 53b (53c and 53d) communicate with each other at their inner ends.

However, the conventional disk brake, having the above-described arrangement, necessitates boring two holes for adjacent cylinders (i.e., the holes 53a and 53b for the cylinders 52a and 52b, and the holes 53c and 53d for the cylinders 52c and 52d) to provide communication between adjacent cylinders of each pair, as described above. Therefore, the prior art suffers from a high machining cost. In addition, since all the holes 53a to 53d cannot be machined simultaneously with boring units having drills, due to interference between the axes of the boring units, the prior art requires a long machining time.

Next, a disk brake according to one embodiment of the present invention will be described with reference to FIGS. 1 to 4. It should be noted that the terms "right and left" employed in the following description are used to mean the right- and left-hand sides as viewed in the drawings for the sake of convenience.

Figure 1:
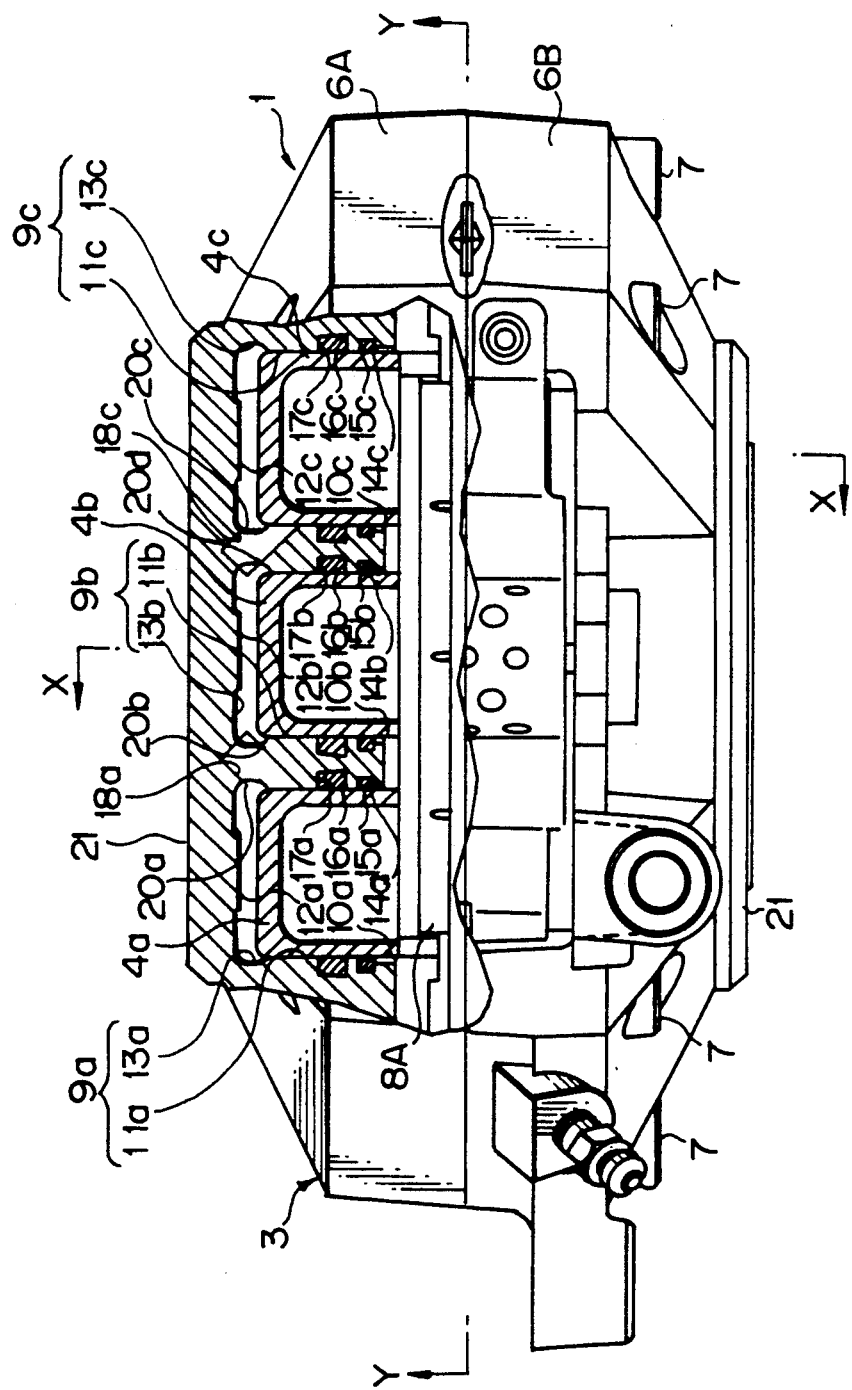
FIG. 1 is a plan view, partially in section, of one embodiment of a disk brake according to the present invention.
Figure 2:
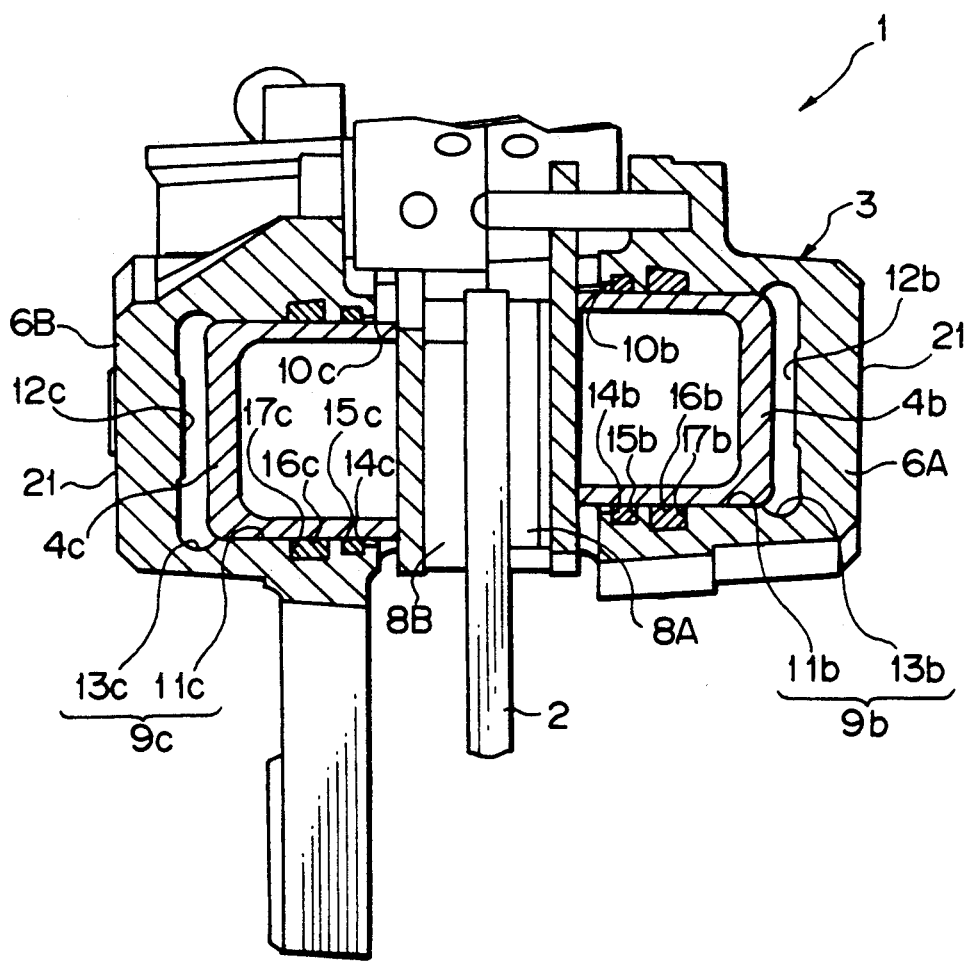
FIG. 2 is a sectional view taken along line X—X in FIG. 1.

As shown in FIGS. 1 and 2, a disk brake 1 includes a disk 2 and a caliper 3 which is disposed astride the disk 2. In this embodiment, the caliper 3 is an opposed-piston type caliper in which pistons 4a to 4c are disposed at each side of the disk 2. The caliper 3 has a pair of halves 6A and 6B, which are fastened together by tie bolts 7 at bridge portions located at the outside of the periphery of the disk 2, thereby forming the caliper 3 straddling the disk 2.

Each of the halves 6A and 6B is formed with three closed-bottom cylinders 9a to 9c (in FIG. 1 only three cylinders 9a to 9c formed in the caliper half 6A are shown in a sectional view). The cylinders 9a to 9c of the two halves 6A and 6B are located at respectively corresponding positions so that when the two halves 6A and 6B are fastened together, the corresponding cylinders 9a to 9c of the halves 6A and 6B face each other, respectively. The cylinders 9a to 9c are slidably fitted with respective pistons 4a to 4c for pressing pads 8A and 8B. The cylinders 9a to 9c respectively have main cylindrical portions 11a to 11c bored to a predetermined depth with a diameter which is a predetermined amount smaller than the diameters of open-end portions 10a to 10c, and annular groove portions 13a to 13c provided at bottoms 12a to 12c of the main cylindrical portions 11a to 11c with a diameter which is a predetermined amount larger than the diameters of the main cylindrical portions 11a to 11c. Among the cylinders 9a to 9c, the main cylindrical portions 11a to 11c have the same depth, and the annular groove portions 13a to 13c also have the same depth. It should be noted that the main cylindrical portions 11a to 11c have the same inner diameter, and the annular groove portions 13a to 13c also have the same inner diameter. In addition, each group of three cylinders 9a to 9c are arranged along the circumferential direction of the disk 2 (see FIG. 3).

Portions of the cylinders 9a to 9c which are close to the open-end portions 10a to 10c are formed with wiper seal grooves 15a to 15c having a rectangular cross-sectional configuration at the same predetermined depth position for retaining wiper seals 14a to 14c, respectively. Further, portions of the cylinders 9a to 9c which are a little closer to the bottoms 12a to 12c than the grooves 15a to 15c are formed with piston seal grooves 17a to 17c having a trapezoidal cross-sectional configuration at the same predetermined depth position for retaining piston seals 16a to 16c, respectively. In general, the piston seal grooves 17a to 17c are formed with a larger diameter than those of the wiper seal grooves 15a to 15c. Therefore, the distance between each pair of adjacent cylinders is determined so that a wall having a predetermined sufficient thickness is left between adjacent piston seal grooves 17a and 17b (17b and 17c).

Figure 4:
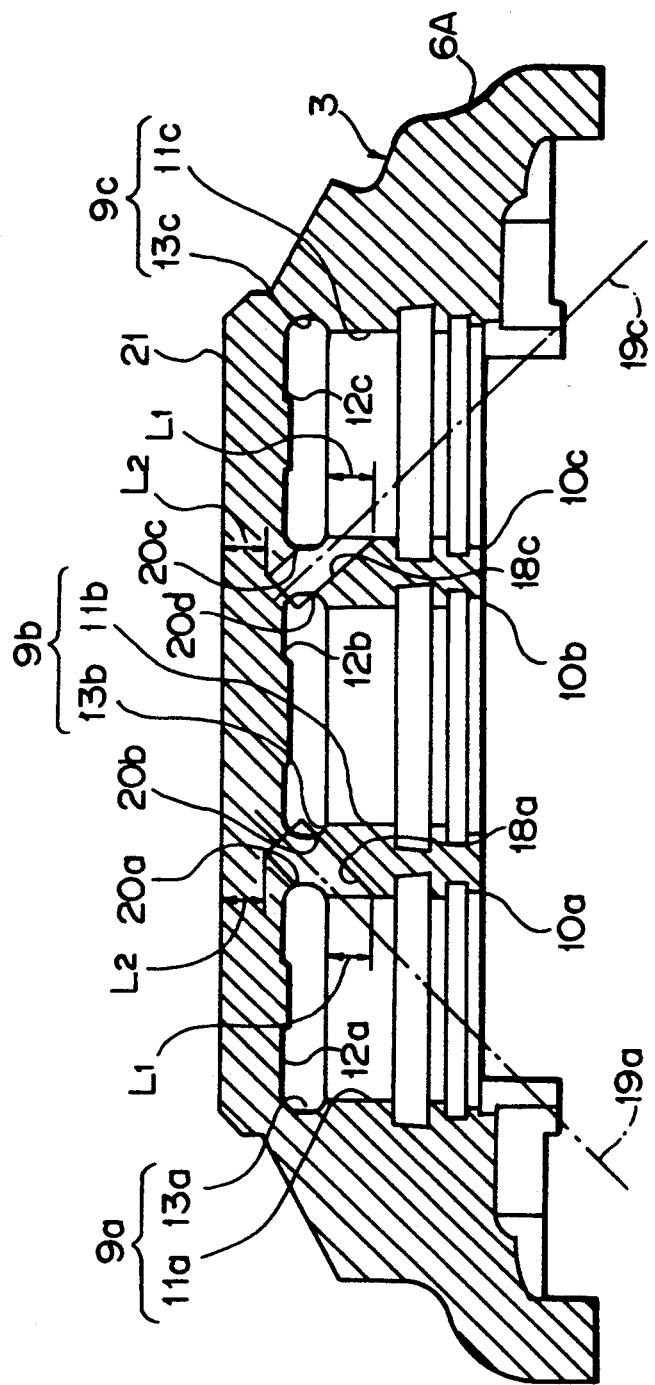
FIG. 4 is a sectional view of one half of a caliper of the disk brake according to the present invention.

In this embodiment, a communicating hole 18a with a predetermined diameter extends from a predetermined position on the inner wall of the main cylindrical portion 11a of the cylinder 9a at the left-hand end, as viewed in FIG. 1, which position is close to the central cylinder 9b. The hole 18a extends to the annular groove portion 13b of the central cylinder 9b, passing through a part of the inner wall of the main cylindrical portion 11a and also through a part of the annular groove portion 13a of the left-hand end cylinder 9a. Similarly, a communicating hole 18c with a predetermined diameter extends from a predetermined position on the inner wall of the main cylindrical portion 11c of the right-hand end cylinder 9c, which position is close to the central cylinder 9b. The hole 18c extends to the annular groove portion 13b of the central cylinder 9b, passing through a part of the main cylindrical portion 11c and also through a part of the annular groove portion 13c of the right-hand end cylinder 9c. These communicating holes 18a and 18c allow a brake fluid to pass among the cylinders 9a to 9c. As shown in FIG. 4, the axes 19a and 19c of the communicating holes 18a and 18c extend towards each other at the bottom side of the cylinders 9a to 9c. Further, the axes 19a and 19c extend at such angles that the drills for making these holes do not interfere with the respective inner walls at those portions of the open-end portions 10a and 10c of the corresponding cylinders 9a and 9c which are remote from the central cylinder 9b.

The left-hand communicating hole 18a is disposed so that the boundary 20a between it and the annular groove portion 13a is offset from the bottom 12a toward the open-end portion 10a, and so that the edge 20b between it and the annular groove portion 13b of the central cylinder 9b is offset from the marginal edge of the groove portion 13b, on the side of the open-end portion, toward the bottom 12b. Similarly, the right-hand communicating hole 18c is disposed so that the boundary 20c between it and the annular groove portion 13c is offset from the bottom 12c toward the open-end portion 10c, and so that the edge 20d between it and the annular groove portion 13b of the central cylinder 9b is offset from the marginal edge of the groove portion 13b, on the side of the open-end portion, toward the bottom 12b. In other words, the intersection (20a) of the communicating hole 18a and the annular groove portion 13a in the sectional view of FIG. 4 is at a position radially outward of the main cylindrical portion 11a. Similarly, the intersection (20b) of the communicating hole 18a and the annular groove portion 13b is at a position radially outward of the main cylindrical portion 11b. The same is the case with the communicating hole 18c.

In the disk brake 1, arranged as described above, the communicating holes 18a and 18c can be bored in the caliper 3 with ordinary boring units (not shown), for example, drill units, in each of which the driving shaft axis and the drill axis are coincident or parallel with each other, because the communicating holes 18a and 18c are provided such that drills for making them do not interfere with the inner walls of the left- and right-hand end cylinders 9a and 9c at the open-end portions 10a and 10c, as described above. Thus, it becomes unnecessary to use special tools and devices for boring the communicating holes 18a and 18c.

In addition, the boring process is required only once for each pair of adjacent cylinders (the cylinders 9a and 9b, or the cylinders 9c and 9b), and it becomes unnecessary to bore two holes therefor (i.e., in this embodiment, in which three cylinders 9a to 9c are provided on each caliper half, only two holes, that is, the communicating holes 18a and 18c, need to be bored, whereas the prior art necessitates boring four holes). Thus, machining costs, e.g., tool costs, can be reduced.

In addition, it is possible to minimize the extent ($L_1$ shown in FIG. 4) to which each of the openings of the communicating holes 18a and 18c are formed along the inner walls of the cylindrical portions 11a and 11c of the left- and right-hand end cylinders 9a and 9c because the communicating hole 18a is disposed so that the intersection (20a) of the communicating hole 18a and the annular groove portion 13a as shown in the sectional view of FIG. 4 is at a point radially outside the main cylindrical portion 11a, while the intersection (20b) of the communicating hole 18a and the annular groove portion 13b is at a point radially outside the main cylindrical portion 11b. The communicating hole 18c is similarly disposed. In addition, since the wall thickness ($L_2$ shown in FIG. 4) between the outer surface 21 of the caliper 3 and each of the communicating holes 18a and 18c is not reduced more than is needed, there is no possibility that ordinary design strength is lowered.

Moreover, since the communicating holes 18a and 18c are provided so that the axes 19a and 19c intersect each other at the cylinder bottom side, there is no interference between boring units, for example, drill units, used to bore the communicating holes 18a and 18c. Accordingly, the layout of the boring units is simplified, and it becomes possible to machine the two communicating holes 18a and 18c simultaneously.

In a case where each of the caliper halves 6A and 6B has a plurality of cylinders as in the illustrated embodiment, the cylinders in one half and those in the other are connected with each other through a proper fluid path so that the same pressure acts in all of the cylinders.

Although in the foregoing embodiment the present invention has been described by way of one example in which two groups of a plurality of cylinders 9a to 9c with the same inner diameter are provided in the caliper 3 in an opposed relationship, it should be noted that the present invention is not necessarily exclusive of a disk brake having such an arrangement and that the present invention may be applied to various other types of disk brakes. For example, the present invention is also applicable to a disk brake in which cylinders are provided in only one of the caliper halves, as a matter of course. It is also possible to apply the present invention to a disk brake in which cylinders have different inner diameters.

Figure 3:
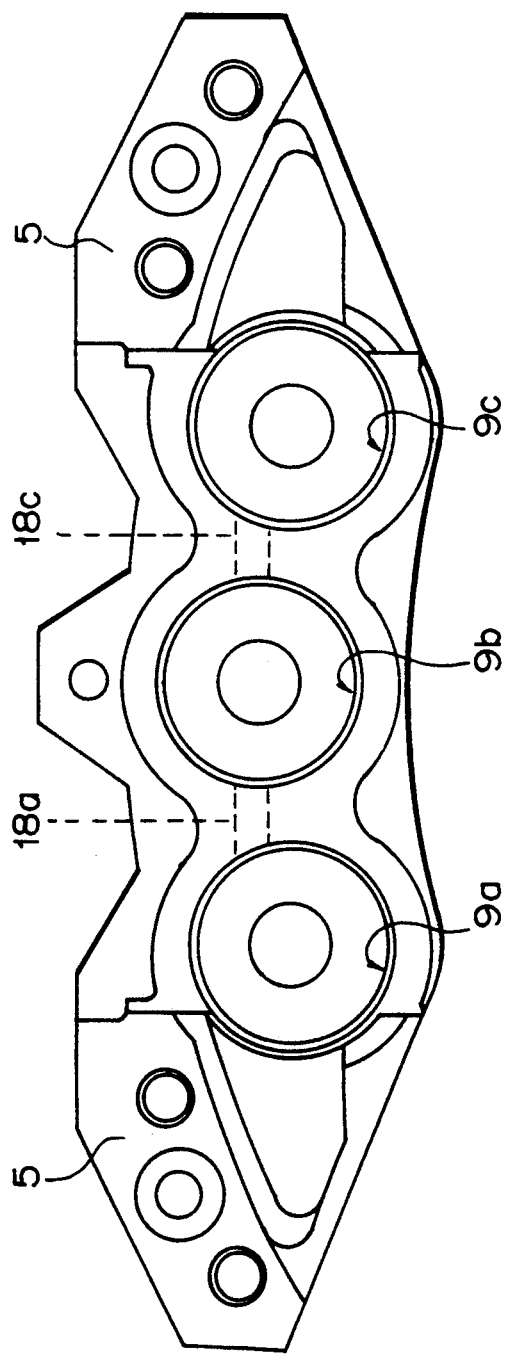
FIG. 3 is a sectional view taken along line Y—Y in FIG. 1.

Further, although in FIG. 3 the communicating holes 18a and 18c are shown to be horizontal, it should be noted that the arrangement is not necessarily limited thereto and that the communicating hole 18a may be provided along an imaginary line intersecting the centers of the cylinders 9a and 9b, and the communicating hole 18c along an imaginary line intersecting the centers of the cylinders 9c and 9b.

As has been described in detail above, the disk brake of the present invention is arranged such that adjacent cylinders communicate with each other through a communicating hole that extends from the inner wall of the main cylindrical portion of one cylinder to the annular groove portion of the other cylinder through the annular groove portion of the first cylinder, and such that the axis of the communicating hole extends at such an angle that a drill for making it does not interfere with the inner wall of the first cylinder at the open-end portion. Thus, if this communicating hole is bored with a boring unit, for example, a drill unit, the boring process is required only once for each pair of adjacent cylinders, and it becomes unnecessary to bore two holes for each pair of adjacent cylinders. Accordingly, the machining cost can be reduced.

In addition, in a case where the caliper has three cylinders, two communicating holes are provided such that the axes thereof intersect each other at the cylinder bottom side, so that there is no interference between boring units, for example, drill units, used to bore the communicating holes. Accordingly, the layout of the boring units is simplified, and simultaneous machining can be effected. Thus, the machining time can be shortened.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A disk brake comprising: a rotating disk, a caliper having portions respectively provided at both sides of said disk so as to face side surfaces of said disk, a pad disposed between each of said portions of said caliper and said disk, at least one of said portions of said caliper being provided with a plurality of cylinders having the same depth, and pistons slidably received in said cylinders for pressing the pad disposed between said at least one of said portions of said caliper and said disk;

each of said cylinders having a main cylindrical wall slidably supporting a respective one of said pistons, a bottom, and an open-end portion defining an opening of the cylinder at which said main cylindrical wall extends into the caliper, and each of said cylinders also defining an annular groove between said bottom of the cylinder and said main cylindrical wall thereof, said annular groove having an outer diameter larger than that of said main cylindrical wall; and said caliper having a respective communicating hole therein that places adjacent ones of said cylinders in communication with each other, said communicating hole extending from said main cylindrical wall of one of the adjacent cylinders to the annular groove of the other of said adjacent cylinders through the annular groove of said one of the adjacent cylinders, said communicating hole having a longitudinal axis that passes through the opening of said one of the adjacent cylinders without intersecting the open-end portion of said one of the adjacent cylinders that defines said opening so that a drill having made said communicating hole did not interfere with the main cylindrical wall of said one of the adjacent cylinders at the open-end portion thereof, said communicating hole and said annular groove of said one of the adjacent cylinders defining an edge at an intersection thereof and which edge is offset from the bottom of said one of the adjacent cylinders in a direction toward the open-end portion of the same cylinder, and said communicating hole and said annular groove of said other of the adjacent cylinders defining an edge at an intersection thereof and which edge is offset in a direction toward the bottom of the other of said adjacent cylinders from an edge of the other of said adjacent cylinders defining a margin of the groove closest to the open-end portion of the same cylinder.

2. A disk brake according to claim 1, wherein said plurality of cylinders are three cylinders which are provided side-by-side, and said communicating holes are provided so that the longitudinal axes of said communicating holes extend towards each other as taken from the openings toward the bottom of the cylinders.

3. A disk brake according to claim 2, wherein said cylinders are arranged along the circumferential direction of said disk.

4. A disk brake according to claim 1, wherein said caliper comprises a pair of halves which are connected to each other outside said disk, said halves respectively including said portions of said caliper.

5. A disk brake comprising: a rotating disk, a caliper having portions respectively provided at both sides of said disk so as to face side surfaces of said disk, a pad disposed between each of said portions of said caliper and said disk, at least one of said portions of said caliper having a row of three cylinders of the same depth provided side-by-side, and pistons slidably received in said cylinders for pressing the pad disposed between said at least one of said portions of said caliper and said disk;

each of said cylinders having a main cylindrical wall slidably supporting a respective one of said pistons, a bottom, and an open-end portion defining an opening of the cylinder at which said main cylindrical wall extends into the caliper, and each of said cylinders also defining an annular groove between said bottom of the cylinder and said main cylindrical wall thereof, said annular groove having an outer diameter larger than that of said main cylindrical wall; and said caliper having communicating holes therein respectively extending from the main cylindrical walls of the cylinders at both ends of the row of said cylinders to the annular groove of a central one of the cylinders through the annular grooves of said cylinders at both ends of the row, said communicating holes having longitudinal axes extending toward each other as taken from the openings toward the bottom of the cylinders, and the longitudinal axes extending through the openings of the said cylinders at both ends of the row and spaced from the open-end portions of the same cylinders so that drills having made the communicating holes did not interfere with the respective main cylindrical walls of said cylinders at both ends of the row at the open-end portions thereof.

6. A disk brake according to claim 5, wherein said cylinders are arranged along the circumferential direction of said disk.

7. A disk brake according to claim 5, wherein said caliper comprises a pair of halves which are connected to each other outside disk, said halves respectively including said portions of said caliper.

* * * * *